United States Patent Office 3,326,358
Patented June 20, 1967

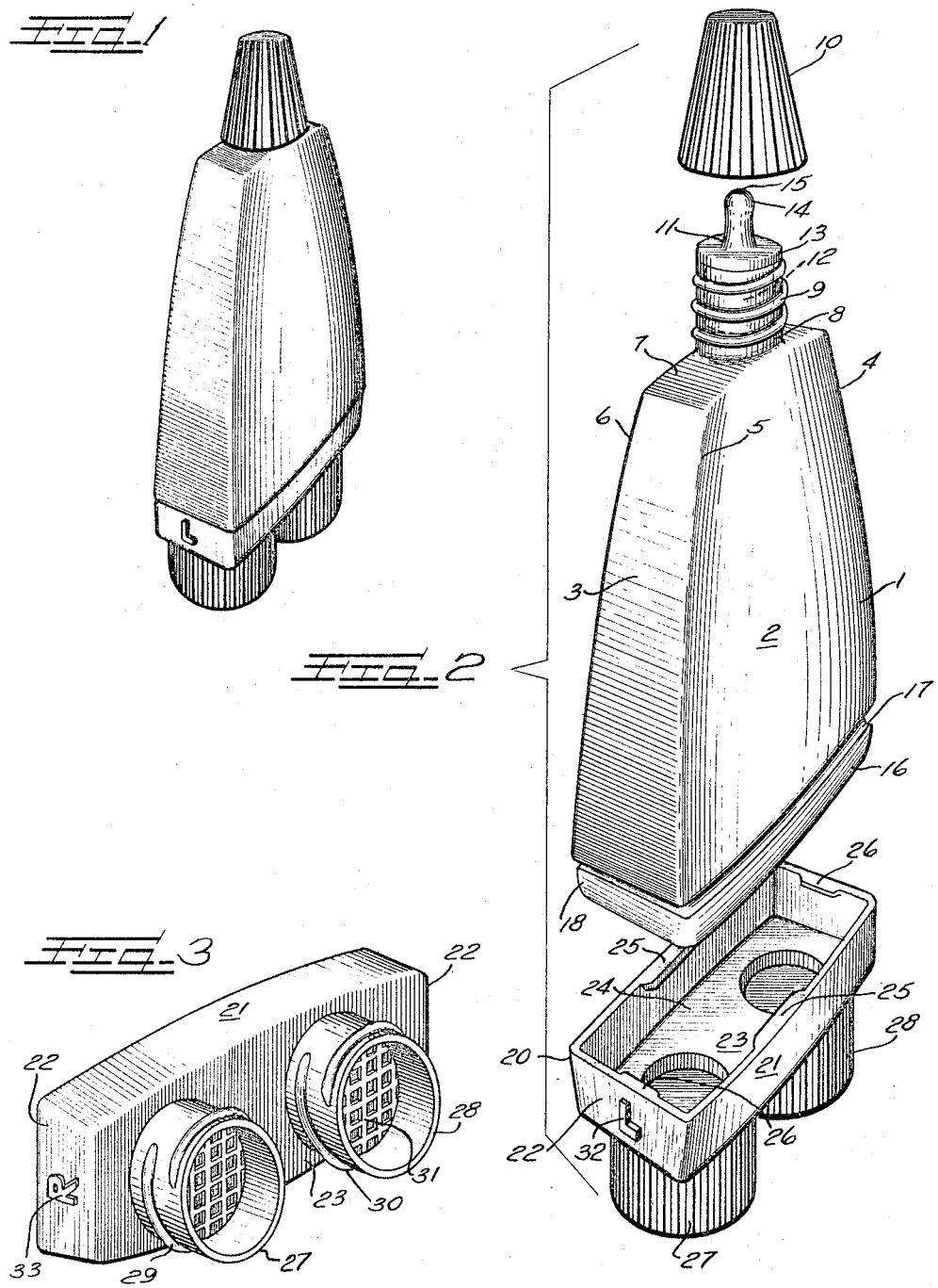

3,326,358
CONTACT LENS CASE
Thomas B. Singleton, Kenilworth, Ill., assignor to The Murine Company Inc., Chicago, Ill., a corporation of Illinois
Filed Mar. 5, 1965, Ser. No. 437,454
3 Claims. (Cl. 206—5)

This invention relates to a container for contact lenses and in particular to a contact lens case that is readily attachable to a lens cleaning fluid container.

While it is widespread knowledge that the use of contact lenses is rapidly becoming accepted as a useful and attractive element in the business and fashion worlds, it is known only to the user, himself, that means to properly care for these instruments have failed to keep pace with other developments in the contact lens field.

Contact lenses are necessarily delicate as they are employed in direct cooperation with the eye. This fact, then, suggests the need for proper storage equipment as well as for means to maintain these lenses in a constant state of cleanliness.

In addition to the requirement for storage and cleaning provisions, contact lenses, to be competitive, must be readily accessible to the user, and their use should not require a major or exhaustive effort regardless of the circumstances. The accomplishment of these objectives rests squarely on the nature of the contact lens case employed.

A typical contact lens case in current usage might take the form of a lady's powder compact having separate spaces therein for the lenses and also for a small dispenser of cleaning fluid.

However, the gross inadequacy of this "compact" case becomes readily apparent from an attempt to employ such a device when a "resting place" is unavailable. This is true as three items must be supported simultaneously: the lens, the cleaning fluid, and the outer case. The immediate result extends from simply a poor cleaning job to an unfortunate loss of a relatively precious lens. The long range result is a continuing inability of the contact lens industry to compete with the conventional eyeglass market.

Therefore it is an objective of this invention to provide a means for efficiently storing and cleaning contact lenses and to enable the contact lens to be as accessible to the user as conventional eyeglasses.

It is also an object of this invention to provide a contact lens case to be readily attached to another container.

It is a further object of this invention to provide a contact lens case having two separate compartments and for being removably attached to a container of contact lens cleaning fluid.

It is an additional object of this invention to provide a contact lens case and a cleaning fluid container for coupling thereto, such that the cleaning fluid container can be discarded and replaced when exhausted, while the contact lens container may be retained and reused.

Additional features, objects and advantages of this invention will be understood from the following description and the associated drawings in which an exemplification of the invention is shown.

On the drawings:

FIGURE 1 shows an isometric view of a contact lens case assembled with its associated parts according to the specification of this invention;

FIGURE 2 is an exploded view of the assembly as shown in FIGURE 1; and

FIGURE 3 is an isolated view of one component of the contact lens case of FIGURE 1 showing the separate lens compartments thereof.

As shown on the drawings:

With FIGURE 1 as an illustration of the assembled unit, detailed reference is made initially to the exploded view of FIGURE 2.

In FIGURE 2, there is shown a cleaning fluid container constructed of a substantially resilient material.

The container 1 has broad principal faces 2 and end faces 3 designed to be of suitable proportions for holding within the palm of the hand. In addition, the faces 2 and 3 join to form edges 4, 5 and 6, tapered, as shown, to more adequately match the hand configuration.

The edges 4, 5 and 6 taper to meet an abruptly defined container top 7 having a neck 8 formed integrally therewith. The neck 8 has a thread 9 disposed for receiving externally a truncated conical cap 10.

The neck 8 is also disposed for receiving, internally, a nozzle 11, having a base 12, an annular ridge 13, and a dispensing head 14. The base 12 is force fitted within the resilient neck 8, and the dispensing head 14 is provided with a capillary 15 for passing a regulated amount of fluid therethrough.

A base 16 of the container 1 is specially molded to receive the contact lens container of FIGURE 2. Principally, this base is comprised of two essential features. First, the uppermost portion has a groove 17 disposed about the circumference thereof, and, second, the lowermost portion 18 is indented to have all points recessed with respect to the principal and end faces 2 and 3. The pertinence of these two provisions will be understood below.

Reference numeral 20 of FIGURE 2 designates generally the contact lens case to be employed in conjunction with the fluid container of FIGURE 1. The case 20 has front and side engagement walls 21 and 22 respectively, formed in conjunction with a lower panel 23 for developing a hollow region 24. In addition, the walls 21 and 22 have inwardly extending lips 25 and 26 formed integrally at the upper edges thereof.

The above-described hollow region 24 of the case 20 is designed to have a configuration and size for being securely fitted about the base 16 of the container 1. In particular the lips 25 and 26 are snap fitted within the groove 17, and the walls 21 and 22 are held against the indented portion 18 to provide a substantially flush junction with the broad faces 2 and 3.

The lenses, themselves, are carried within separate compartments 27 and 28 shown in FIGURE 2 and more clearly illustrated in FIGURE 3. In FIGURE 3, the compartments 27 and 28 are seen to be abrupt cylinders formed integrally with the panel 23 and provided with threaded surfaces 29 and 30 for receiving a complementarily threaded cap thereabout as indicated in FIGURE 2.

Viewing the interior of the compartments 27 and 28, it can be observed that a seat 31 takes the form of a network of raised crosshatched ridges. This irregular surface is purposeful and will prevent sticking or staining of the lenses due to residue moisture collected thereon.

Finally, to unmistakably mark the individual compartments, raised letters 32 and 33 are provided at the walls 22 and serve to designate the Left and Right lens respectively.

The principal advantages of this invention are self evident to the contact lens user. The necessary cleaning and sanitation fluid is available in a container having a contact lens case attached thereto. The two devices may be held as a single unit, freeing the second hand thereby for manipulating the lenses, themselves.

Furthermore, here, an intelligent amount of cleaning fluid can be made available as the wasted space of the "compact" cases has been eliminated.

In addition, the cost of providing a contact lens case has been significantly reduced, first, by the inexpensive nature of the resilient material used, and second, by elimination of the need for a container within a container as in the "compact" type case. Also, the fact that the applicant's contact lens case may be detached from the fluid container avoids duplication of that structure when a fresh fluid supply is required.

It will be understood that various modifications may be suggested by the embodiment disclosed, but I desire to claim within the patent warranted hereon all such modifications as come within the scope of my invention.

I claim as my invention:
1. A device for storing contact lenses and fluid for cleansing the lenses comprising:
   a first resilient container having a cavity for holding a cleansing fluid and a spout for dispensing fluid from the cavity,
   said first resilient container having side walls and a base,
   said side walls having a groove formed around the periphery thereof,
   said groove being substantially parallel to said base and spaced therefrom,
   a second resilient container having an open attachment section,
   said open attachment section having side walls conforming substantially to the side walls of said first container and having a base wall,
   said side walls having a number of lips extending therefrom inwardly toward the center of the attachment section and being snap fitted within said groove,
   said base wall of the attachment section having first and second lens compartments formed in side-by-side relation at the outside surface thereof,
   said lens compartments having cap members threadedly mounted thereon and protruding downwardly from the base of the attachment section to support the combination of the first and second containers in an upright position.
2. A device for storing contact lenses and fluid for cleansing the lenses in accordance with claim 1 wherein said lens compartments have ribbed base walls for supporting contact lenses therein with a minimum of surface contact with the lenses.
3. A device for storing contact lenses and fluid for cleansing the lenses in accordance with claim 1 wherein said side walls of said first container have a portion thereof recessed from said groove to said base thereof, thereby allowing the side walls of the second container to be flush with the portion of the side walls of the first container extending from the groove to the spout thereof.

References Cited

UNITED STATES PATENTS

| | | | |
|---|---|---|---|
| 2,940,589 | 6/1960 | Silverman | 206—5 |
| 2,998,893 | 9/1961 | Thomas | 220—23 X |
| 3,089,500 | 5/1963 | Stalcup | 206—5 |
| 3,178,015 | 4/1965 | Barker | 206—5 |
| 3,185,291 | 5/1965 | Lerner | 215—100 X |
| 3,211,281 | 10/1965 | Speshyock et al. | 206—5 |

THERON E. CONDON, *Primary Examiner.*

MARTHA L. RICE, *Assistant Examiner.*